United States Patent [19]

Rodriguez et al.

[11] Patent Number: 5,262,847
[45] Date of Patent: Nov. 16, 1993

[54] METHOD OF CONVERTING LUMINANCE-COLOR DIFFERENCE VIDEO SIGNAL TO A THREE COLOR COMPONENT VIDEO SIGNAL

[75] Inventors: Arturo A. Rodriguez, Belmont, Calif.; Mark A. Pietras, Boynton Beach, Fla.; Andres J. Saenz, Belmont, Calif.

[73] Assignee: International Business Machines Corporation, Armonk, N.Y.

[21] Appl. No.: 963,874

[22] Filed: Oct. 20, 1992

[51] Int. Cl.$^5$ .............................................. H04N 9/64
[52] U.S. Cl. .................................. 358/21 R; 358/30; 358/527
[58] Field of Search .................. 358/30, 80, 21 R; 395/131, 132; 340/703

[56] References Cited

U.S. PATENT DOCUMENTS

| | | | |
|---|---|---|---|
| 4,599,611 | 7/1986 | Bowker et al. | 340/721 |
| 4,712,099 | 12/1987 | Maeda | 340/703 |
| 4,739,313 | 4/1988 | Oudshoorn et al. | 340/703 |
| 4,829,455 | 5/1989 | Long et al. | 395/131 |
| 4,965,745 | 10/1990 | Economy et al. | 364/518 |
| 4,975,861 | 12/1990 | Fujimoto | 395/100 |
| 5,051,929 | 9/1991 | Tutt et al. | 395/131 |
| 5,065,143 | 11/1991 | Greaves et al. | 340/701 |
| 5,065,231 | 11/1991 | Greaves et al. | 358/231 |
| 5,130,786 | 7/1992 | Murata et al. | 358/21 R |

FOREIGN PATENT DOCUMENTS 0466374 1/1992 European Pat. Off. .

OTHER PUBLICATIONS

"Encoding Parameters of Digital Television For Studios", CCIR XVIth Plenary Assembly, Document 11/1041-E, Dubrovnik, Dec. 11, 1985, pp. 1-10.
"Default RGB Color Palette with Simple Conversion from YUV", IBM Technical Disclosure Bulletin, vol. 33, No. 5, New York, U.S., Oct., 1990, pp. 200-205.
"NTSC Luminance/Chrominance Equation Definition for Digital Systems", IBM Technical Disclosure Bulletin, vol. 32, No. 10A, New York, U.S., Mar., 1990, pp. 208-209.

*Primary Examiner*—Mark R. Powell
*Assistant Examiner*—John W. Miller
*Attorney, Agent, or Firm*—Paul W. O'Malley; Andrew J. Dillon

[57] ABSTRACT

A method of converting a digital video signal having a luminance component for each pixel of a frame and two color difference components for contiguous groups of pixels in the frame into a video signal having three color components for each pixel is disclosed. Two color lookup tables are provided, each being indexed by a combination of the luminance level for a pixel and a color difference component for the group including the pixel. Entries in each color lookup table include a component value for one color and a subcomponent contributing to a component value for another color. The method provides combining the luminance components and color difference components for each pixel represented in the compressed digital video signal to retrieve the color component values for the three color video signal. Two colors are extracted directly from the lookup tables. The third color component is generated by combining subcomponent values extracted from the tables.

15 Claims, 3 Drawing Sheets

METHOD OF CONVERTING LUMINANCE-COLOR DIFFERENCE VIDEO SIGNAL TO A THREE COLOR COMPONENT VIDEO SIGNAL

BACKGROUND OF THE INVENTION

1. Technical Field

The invention relates to the storage and playback of images and video segments on a display device for a digital computer, and more particularly relates to a system and a method of converting video information digitally coded using one luminance and two color difference signals to a three color component signal for reproduction. Still more particularly, the invention relates to a software based method for conversion of the data formats carrying color and luminance intensity information which is readily executed by a personal computer based on an Intel 80386SX microprocessor running at 16 Mhz.

2. Description of the Related Art

A video signal comprises a sequence of frames, which when displayed at a given frame rate (e.g., 15 to 30 frames-per-second in a personal computer), simulate the appearance of motion to a human observer. In a personal computer system, each frame of the video image comprises an matrix of picture elements or "pixels." A typical matrix may have 320 columns by 240 rows. A pixel is the minimum unit of the picture which may be assigned a luminance intensity, and in color video, a color. Depending upon the data format used, as many as three bytes of data can be used to define visual information for a pixel. A complete description of all pixels for an entire frame can require several hundred thousand bytes of data.

For a raw frame captured in a matrix of 640×480 pixels, a digitized representation in a 24-bit RGB (Red, Green and Blue) format requires about one million bytes of data to store the frame if compression is not applied to the data. For a video segment, if full frames were replaced at a frame rate of 30 frames per second, a computer would be required to recover from storage and write to video memory 30 million bytes of data each second. Few contemporary mass data storage devices have both the bandwidth required to pass such quantities of data or the storage capacity to hold more than a few minutes worth of digital video information. As used here, bandwidth means the volume of data per unit time which can be recovered from an auxiliary storage device. Data compression is used to accommodate auxiliary storage devices in the storage and recovery of video segments for playback in real time.

Data compression allows an image or video segment to be digitized and stored in substantially fewer bytes of data than required for full frame reproduction. Data compression can be based on eliminating redundant information from frame to frame in a digitized video segment, on eliminating redundant information from pixel to pixel in one frame, or by exploiting superior human perception of luminance intensity detail over color detail. High quality color images are typically captured and digitized in 24-bit RGB format (RGB24). In RGB24 one byte of data corresponds to the red (R) component contribution to a pixel, one byte of data corresponds to the green (G) component contribution to the pixel and one byte of data corresponds to the blue (B) component contribution to the pixel. Luminance intensity (Y) is then derived from a proportional combination of the three contributing components:

$$Y = 0.299R + 0.587G + 0.144B.$$

The International Radio Consultative Committee (CCIR) in its Recommendation 601 called for digital coding of color images based instead on use of an explicit luminance intensity component (Y) and two color difference components (e.g. $C_R$ and $C_B$ for the red and blue difference signals, respectively). For compression, the CCIR coding methodology applies a four to one spatial subsampling of each of the color components. Successive two by two pixel regions of a digitized frame are encoded using an individual one byte luminance value for each pixel and two bytes of representative color difference values for the four pixel region. The methodology results in representation of four pixels with six bytes of information, or an average of one and one half bytes per pixel. Since the original RGB24 data consist of three bytes per pixel, compression of up to 50% is achieved.

Display adapters in common use on contemporary personal computers (e.g. Extended Graphics Array (XGA)) do not have a luminance-color difference display mode. Accordingly they cannot use a luminance-color format such as $YC_RC_B$. However, the $YC_RC_B$ format can be converted an RGB format using the following equations:

$$R = MIN[255, MAX[0, y + 1.402(C_R - 128))]],$$

$$G = MIN[255, MAX[0, (Y - 0.174(C_R - 128) - 0.344(C_B - 128))]],$$

$$B = MIN[255, MAX[0, (Y + 1.772(C_B - 128))]].$$

Use of the conversion equations requires six comparison, four multiplication and six addition operations for every pixel. Multiplication operations are relatively complex compared with additions and comparisons. The computational burden presented by the number of required operations is excessive for the microprocessors used in some personal computers if conversion of formats is to be handled through the computer central processing unit. For example, an Intel 80386SX microprocessor clocked at 16 Mhz will struggle to maintain a 5 frame per second replacement rate and cannot maintain a 15 to 30 frame per second frame replacement rate if required to carry out the above conversion steps. An attempt to so use it results in degradation of the rate of frame replacement and slowing of the reproduced video segment.

An alternative to the direct assault on the problem represented by use of the conversion equations is to use lookup tables (LUT). Such lookup tables would represent the results of execution of the conversion equations on at least a set of the possible input values for Y, $C_R$ and $C_B$ prior to their actual receipt. Upon receipt of a set of values for a pixel in $YC_RC_B$ format, the values are used as indices into lookup tables to return an RGB representation. From the above conversion equations we can see that the red and blue values each depend upon two of the three components of the $YC_RC_B$ format. The green component depends upon all three components in the $YC_RC_B$ format. Where each component in the $YC_RC_B$ format is represented in one byte it can be shown that the red and blue components for the RGB format will each require a $2^{16}$ bytes or a 64 Kbyte lookup table. However, the green component would require $2^{24}$ bytes, or a 16 Mbyte lookup table. Lookup tables for all three components of the RGB formatted data would consume 16.125 Mbytes of data storage, which is excessive in most applications and untenable in most personal computers where 1 to 4 Mbytes is a common capacity for memory.

SUMMARY OF THE INVENTION

The invention provides a method and system for decompressing a digital video signal having a luminance component for each pixel of a frame and two color difference components for a pixel region in the frame into a video signal having three color components for each pixel. Two color lookup tables are provided, each being indexed by a combination of the luminance level for a pixel and a color difference component for the pixel region. Entries in each color lookup table include a component value for one color and a subcomponent contributing to a component value for another color. The method provides combining the luminance components and color difference components for each pixel represented in the compressed digital video signal to retrieve the color component values for the three color video signal. Two colors are extracted directly from the lookup tables. The third color component is generated by combining subcomponent values extracted from the tables.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

"OS/2" and "PS/2" are registered trademarks of International Business Machines Corporation in the United States. "80386SX" is a registered trademark of Intel Corporation in the United States.

Figure 1:
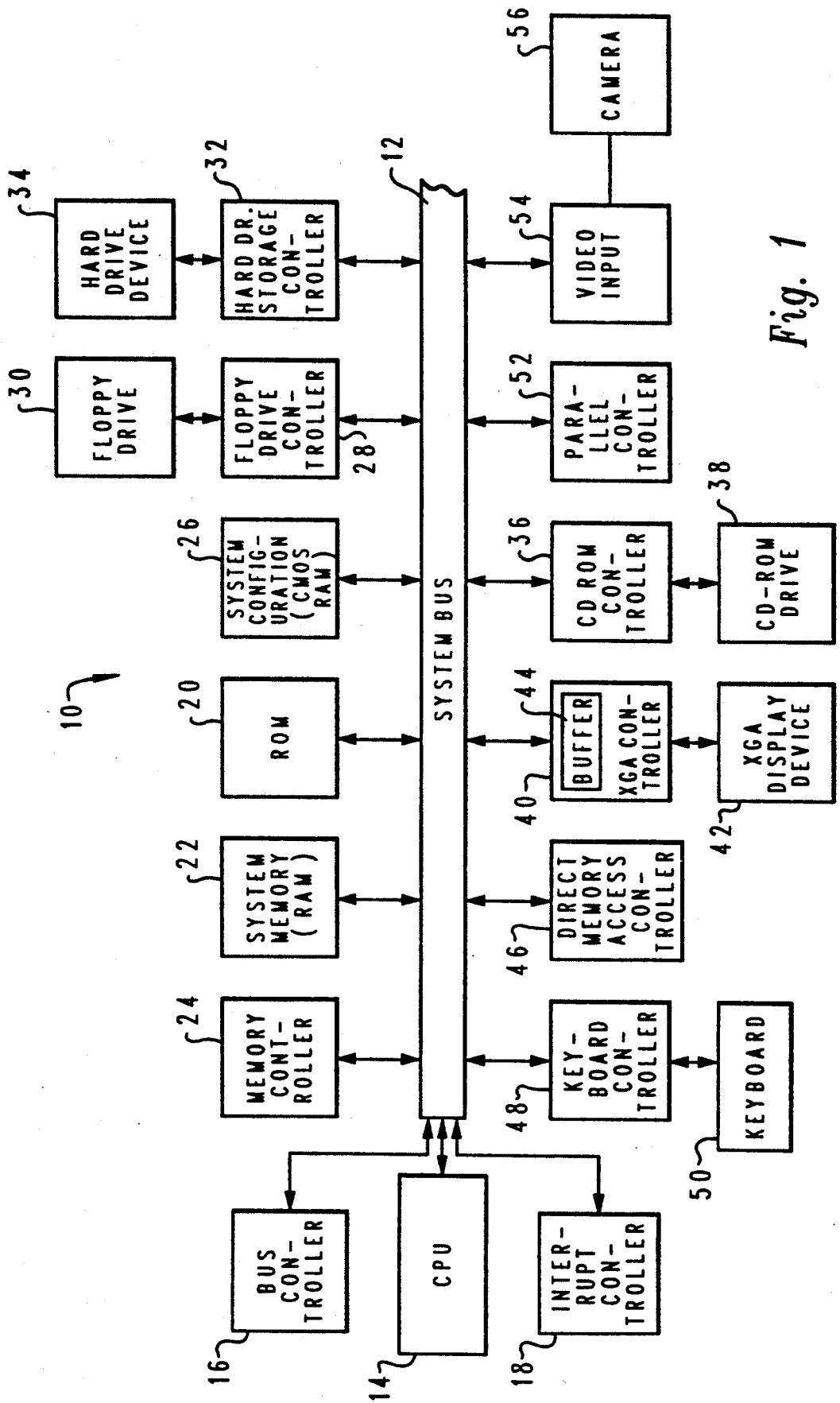
FIG. 1 is a high level block diagram of a data processing system which can be utilized to implement the method of the present invention.

With reference now to the figures and in particular with reference to FIG. 1, there is depicted a block diagram of a personal computer system 10, preferably an IBM PS/2 personal computer. Computer system 10 includes a 16-bit or 32-bit wide system bus 12. Connected to system bus 12 is a central processing unit (CPU) 14, based on an Intel 80386SX or more powerful microprocessor, clocked at a minimum of 16 Mhz. CPU 14 passes data to and receives data from other devices attached to system bus 12 over the system bus. Traffic on the bus is controlled by a bus controller 16. An interrupt controller 18 handles interrupts passed between CPU 14 and the remaining devices.

Read only memory (ROM) 20 is non-volatile memory storing power on test processes and a basic input/output system (BIOS or ROM-BIOS). BIOS is microcode controlling basic hardware operations such as CPU 14 interaction with disk drives and a keyboard. System memory 22 is addressable random access memory into which an operating system and programs are loaded for execution. The IBM OS/2 operating system is a preferred operating system. Additional hardware components of computer 10 attached to system bus 12 include a memory controller 24 and a system configuration store 26, provided by random access memory (RAM) having low refresh power requirements (e.g. complimentary metal oxide semiconductor based memory).

Auxiliary data storage is provided by peripheral controllers and associated storage devices including, a floppy disk or diskette controller 28 and drive 30, a hard drive controller 32 and hard drive device 34, and a compact disk (CD) read only memory (ROM) controller 36 with CD-ROM drive 38. Digital video signals, compressed in accordance with the system and method of the invention, may be supplied to computer system 10 from compressed video data stored on portable media mounted in CD-ROM drive 38. After decompression by CPU 14, visual reproduction of video segments is carried out over a extended graphics array (XGA) controller 40 and XGA display 42. XGA controller 40 includes a RAM buffer 44 into which the current frame for display is stored. In some computers buffer 44 may be loaded directly from system memory 22 or from an auxiliary storage controller. In system 10, CPU 14 handles conversion of $YC_RC_B$ data read from CD-ROM drive 38 to an RGB format and placement of the converted data in the appropriate locations in buffer 44 for updating the frame for display on device 42.

Direct access memory (DMA) controller 46 handles data transfer between auxiliary storage devices or other input/output devices, and system memory 22 without interaction by CPU 14. Keyboard controller 48 provides an interface to a keyboard 50, for user entries, and may be used to provide an interface to a "mouse". Parallel controller 52 is a device controller for an input or output device (e.g. a printer connected to computer 10 by a parallel cable).

Video signals may come from a number of sources, including graphics generated by an application program executing on CPU 14 or from a video camera 56 and an associated video interface 54. Video interface 54 converts an analogue National Television Standards Committee (NTSC) video signal into a digital video signal. The digital signal is a series of frames comprising arrays of bytes conveying intensity or color information (e.g. RGB values) for the picture elements. The frames are presented in a time ordered sequence. Digital video signals supplied by video input interface 54 are processed by CPU 14 to produce a compressed video signal comprising an initial frame and subsequent frame difference information for storage on a hard drive device 34. Alternatively, a CD-ROM may store a video segment in a compressed data format. CPU 14 may thereafter recover the segment in the form of the compressed video signal from drive 34 or drive 38 for conversion to an RGB format and reproduction of the video image on display 42.

Figure 2:
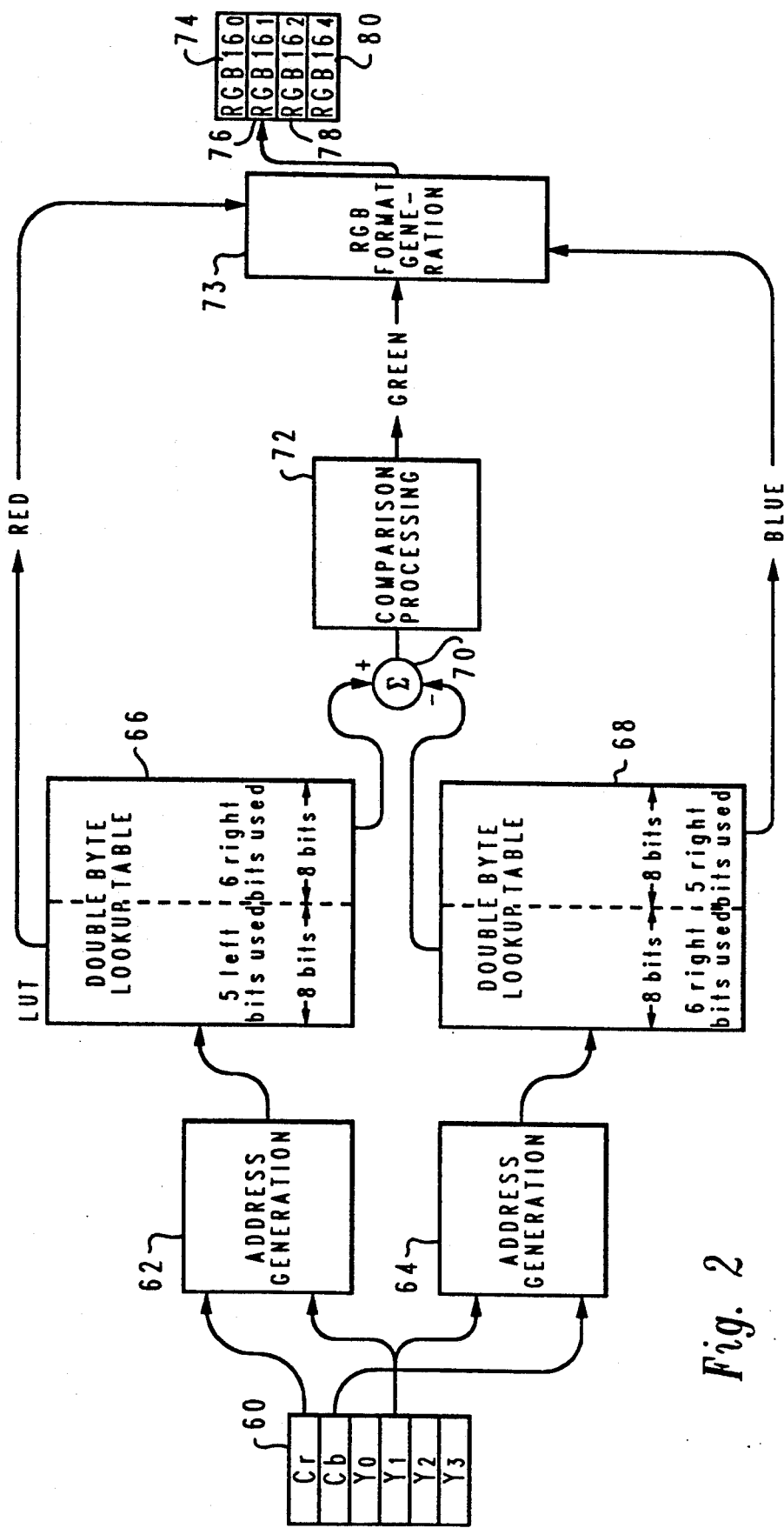
FIG. 2 is a block diagram of a system for converting a luminance-color difference representation of an image to a three color representation of the image.

FIG. 2 depicts a block diagram of a system for converting from a $YC_RC_B24$ format to an RGB16 format. In RGB16 formats, a double byte is used to store the three color components for a pixel. In the particular RGB16 format used here, 5 of the 16 bits of a double byte are used to set the red value, 6 bits set the green value and 5 bits set the blue value. In the compressed $YC_RC_B24$ format a luminance intensity value is provided with 8 bit resolution for each pixel. Every 2 by 2 pixel region receives two color difference values, again with 8 bit resolution. Of course, different $YC_RC_B24$ formats which could alter particulars of the specific conversion illustrated. For example, in some formats color is averaged over $2 \times 1$ pixel regions and in some formats no color difference averaging is used (i.e. a $1 \times 1$ pixel region).

Provided from drive 38 is a block 60 having, by way of example, 6 bytes of data for a 2 by 2 region. The six bytes include an individual luminance value ($Y_0$ to $Y_3$) for each pixel of the region and two representative color difference values ($C_R$ and $C_B$) for the region as a whole. Alternative formats for the luminance-color difference data exist.

To generate the values of the components of the decompressed RGB video output signal, two table lookup operations are performed for each pixel in each region. Address generation into lookup tables 66 and 68 is executed by address generator blocks 62 and 64. Address generator 62 combines the first color difference value $C_R$ with each of the pixel luminance values in turn to generate indices into first color or red lookup table 66. The second color difference value $C_B$ is combined with each of the pixel luminance values in turn through address generator 64 to generate indices into second color or blue lookup table 68. Because the preferred RGB16 format utilizes only 5 bits of resolution for red and blue and 6 bits of resolution for green, lookup tables 66 and 68 need not have a location corresponding to every possible combination of luminance intensity and color difference value from block 60. In generating the indices, address generators 62 and 64 drop the less significant bits from the color difference values and color luminance values and then concatenate the results. Alternatively, only the more significant bits of the luminance and color difference values are stored to further compress the video data segment.

For each pixel in the output frame, two addresses are generated to address each of two lookup tables 66 and 68. Since the red component depends only on luminance intensity Y and the red color difference component $C_R$, red lookup table is indexed by composing an address from the $(8-L)$ most significant bits of Y and the $(8-M)$ most significant bits of $C_R$ where L and M are integers less than 8. Thus the number of entries in the red lookup table 66 equals $2^{(16-L-M)}$. Similarly, an index into the blue component lookup table 68 is composed from the $(8-L)$ most significant bits of Y and the $(8-N)$ most significant bits of $C_B$, resulting in a blue component lookup table having $2^{(16-L-N)}$ entries. For conversion of luminance-color difference values into RGB24, L, M and N equal 0. The maximum possible space required for both lookup tables is thus 256 Kbytes. For conversion to the RGB16 format described above, M and N equal 3 and L equals 2. Only 8 Kbytes of memory is required to support conversion to the RGB16 format.

The green (G) component of the final RGB representation of the pixel is divided between lookup tables 66 and 68. So long as the resolution of the green component is not much greater than that for red and blue, additional entries do not need to provided to fit green into the available entries. The entries in lookup tables 66 and 68 have double byte entries. In red lookup table 66 the first byte corresponds to the red component and accordingly takes 5 bits of the entry. For RGB16 the 5 left most bits in the byte are used. The second byte is used as a signed subcomponent $G_0$ (i.e. a two's complement value) used to find the final green value for the pixel. in blue lookup table 68 the first byte is a signed contribution $G_1$ used to find the final green value for the pixel. The right most six bits of the respective bytes are used for both $G_0$ and $G_1$. The second byte of the entires in lookup table 68 provides the blue contribution in the 5 right most bits.

The lookup table entry components and subcomponents are based on the equations in the 601 Recommendation. The values in the R and B portions of the entries may disregard the least significant bits of the luminance intensity-color components depending upon the resolution of the color in the RGB representation. $G_0$ and $G_1$ can be calculated in various ways as long as the color difference terms are separated between the lookup tables. For RGB16 the values in lookup tables 66 and 68 may be calculated as follows:

Red: $MIN[255, MAX[0, (Y+1.402(C_R-128))]]$ $G_0$: $(P_Y*Y)-0.714 * (C_R-128)$ $G_1$: $((1-P_Y)*Y)-0.344*(C_B-128)$

Blue: $MIN[255, MAX[0,(Y+1.772*(C_B-128))]]$.

where $P_Y$ is the percentage of Y you want in red lookup table and where, during real time display, G is determined by the following comparison:

$G=MAX[0, (G_0+G_1)]$.

In the above equation $G_1$ depends only on $C_B$ and accordingly takes only $2^{(8-L-N)}$ different values. The lookup table is filled with repetitive sections to avoid need to access the table twice.

The summation of subcomponents $G_0$ and $G_1$ is carried out by summer 70. The comparison is part of comparison processing 72 and produces G. Thus, the R, G and B components are found after executing three table lookup operations, one addition operation and one comparison operation. RGB format generator 73 performs any rotation, shift and mask operations required to fit the components into the three color format sent to the display adaptor. From each block 60, four pixel RGB value sets 74, 76, 78 and 80 are generated. The number of bits disregarded for each of the luminance-color difference components do not have to be the same from application to application.

Figure 3:
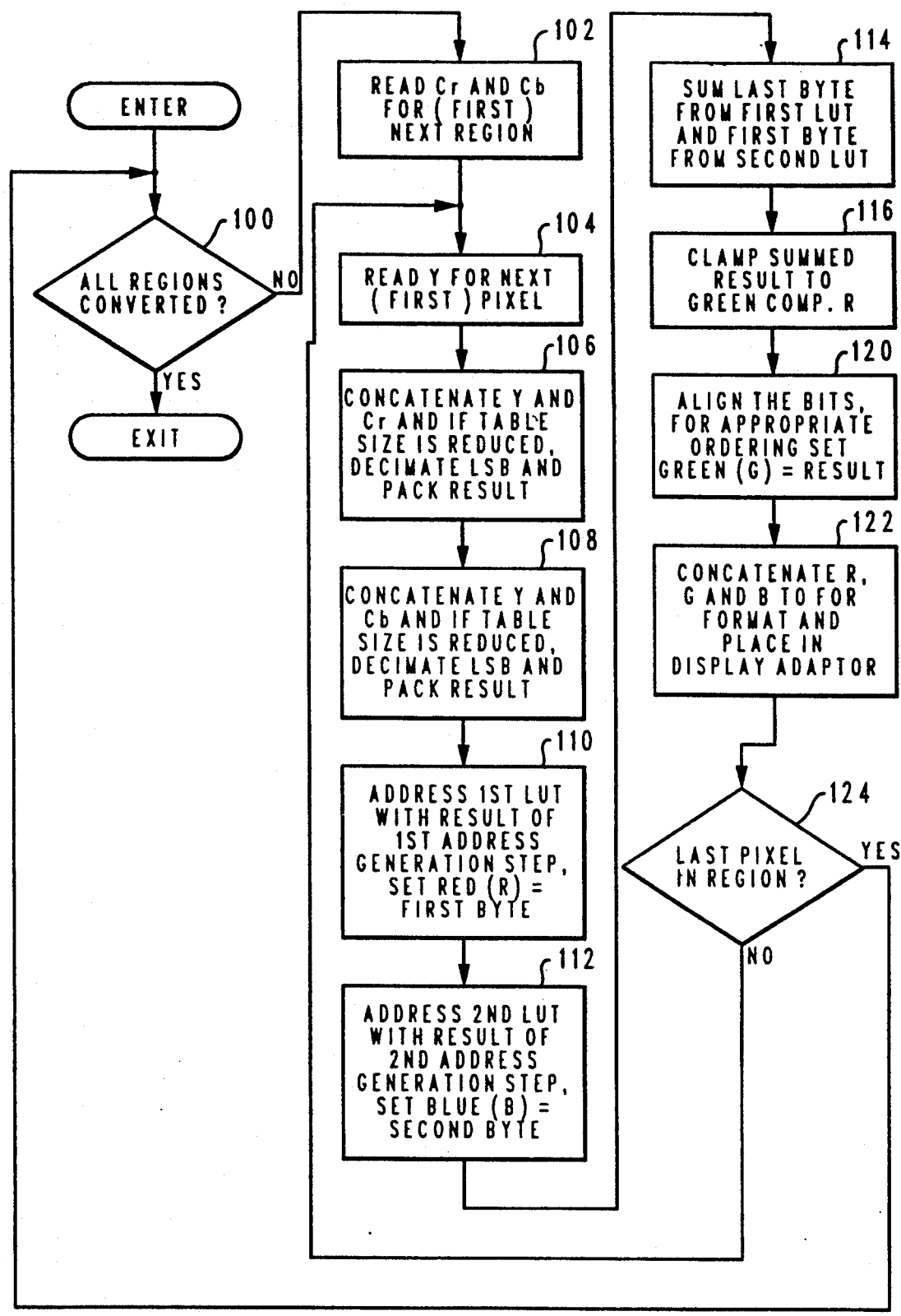
FIG. 3 is a logical flow chart for a process for implementing the invention on a programmable general purpose digital computer.

FIG. 3 is a flow chart of a process for implementing the conversion of a frame of data on a programmed computer. The process is entered at step 100, where it is determined if all regions for a frame have been converted. If all regions have been processed, the process is exited along the yes (Y) branch.

If regions remain to be processed, the no (N) branch from decision step 100 is followed to step 102, where the color difference values for the next region are read. Next, step 104 is executed to read the luminance intensity for the next pixel within the region. At step 106 the luminance intensity for the pixel is concatenated with the red color difference value for the region. Depending upon the formats of the input data and the output data, the input values may be decimated by eliminating the most significant bits and the remaining bits packed to form an address into a red lookup table. Next, step 108 is executed to concatenate the luminance intensity value for the pixel and the blue color difference value for the region. Again, depending upon the formats used, the inputs may be decimated and packed to generate the address.

With steps 110 and 112 the addresses generated by steps 106 and 108 are utilized as indices into the two lookup tables. The red and blue values respectively are returned from the tables, along with two subcomponents for the green component of the RGB output. Next, step 114 is executed to sum the green subcomponents. The result of the summation is clamped to the desired range of values at step 116. Step 120 aligns the bits of the green value for positioning into the two byte space allowed for RGB16. Next, step 122 is executed to place the red, green and blue values into a one, two, or three byte space, depending on the output format and to move the result to a memory buffer for a display adaptor. Step 124 is executed to determine if the last pixel in a region has been converted. If the last pixel has not been converted, the no (N) branch from step 124 is followed back to process block 104 to begin processing of the next pixel in the region. If the last pixel for a region has been processed, the process follows the yes (Y) branch from decision block 124 to step 100 to determine if any more regions require processing. If the luminance-color difference data are not compressed, i.e. each pixel has individual color difference values, the result of this step is always yes.

The lookup tables required for execution of the process can be of minimal size. For $L=M=N=3$, each lookup table will have 1,024 entries for a total memory usage of about 4 Kbytes. For RGB24, $L=M=N=0$, and total memory consumption reaches a maximum of 256 Kbytes. Such memory requirements can be met by virtually all contemporary personal computers. Execution of the process requires only one summation and one comparison, in addition to some register shifts and rotations. Thus the mathematical processing load is greatly reduced compared with direct conversion taught by the prior art.

While the invention has been particularly shown and described with reference to a preferred embodiment, it will be understood by those skilled in the art that various changes in form and detail may be made therein without departing from the spirit and scope of the invention.

What is claimed is:

1. Apparatus for converting an input digital video signal having a luminance component for each pixel and first and second color difference components for each pixel region to an output video signal having first, second and third color components, the apparatus comprising:
    a data storage device;
    a first color lookup table stored in the data storage device having a plurality of entries, each entry including a first color component value and a third-color subcomponent value;
    a second color lookup table stored in the data storage device having a plurality of entries, each entry including a second color component value and a third-color subcomponent value;
    means for generating a first address into the first color lookup table from a luminance component for a pixel and a first color difference component for a pixel region;
    means for generating an second address into the second color lookup table from a luminance component for the pixel and a second color difference component for the pixel region;
    means for retrieving an entry from the first color lookup table using the first address and for extracting a first color component value from the entry;
    means for retrieving an entry from the second color lookup table using the second address and for extracting a second color component value from the entry;
    means for extracting the third-color subcomponent values from the entries retrieved from the first and second color lookup tables, respectively; and
    means for combining the third-color subcomponent values to generate a third color component value.

2. Apparatus as set forth in claim 1, wherein the third-color subcomponent values include predetermined portions of the entries in the first and second lookup tables and are expressed as signed values.

3. Apparatus as set forth in claim 2, wherein the means for combining the third-color subcomponents comprises:
    means for summing the third-color subcomponent values; and
    means for clamping the summed third color-subcomponent values to a selected range.

4. Apparatus as set forth in claim 2, wherein the third color component value depends upon the first and second color difference components and the luminance component of the input digital video signal and wherein the first and second color lookup tables include, respectively, contributions of the first and second color difference signals to the third color component values.

5. Apparatus as set forth in claim 1, and further comprising:
    means for aligning the first, second and third color component values into a selected three color format for a video signal.

6. Apparatus as set forth in claim 5 and further comprising:
    a raster scanned image generator taking the first, second and third color component values of the output video signal as an input.

7. Apparatus as set forth in claim 1, and further comprising:
    means for positioning the first, second and third color component values into a sixteen bit format for a video signal.

8. A method of converting an input digital video signal having a luminance component for each pixel and two color difference components for pixel regions into an output video signal having three color components for each pixel, the method comprising the steps executed by a computer of:
    generating a first index from a luminance component for a pixel and a first color difference component for a pixel region including the pixel;
    retrieving an entry from a first color lookup table corresponding to the first index;
    generating a second index from the luminance component and a second color difference component for the pixel region;
    retrieving an entry from a second color lookup table corresponding to the second index;
    extracting a first color component from the entry retrieved from the first color lookup table;

extracting a second component from the entry retrieved from the second color lookup table;

extracting third color subcomponents from the entries retrieved from the first and second color lookup tables, respectively; and combining the third color subcomponents to generate a third color component.

9. A method of converting an input digital video signal into an output video signal as set forth in claim 8, wherein the third color subcomponents include predetermined portions of the entries in the first and second lookup tables and are expressed as signed values.

10. A method of converting an input digital video signal into an output video signal as set forth in claim 9, wherein the step of combining the third color subcomponents comprises:

summing the third color subcomponents; and clamping the summed third color subcomponents to a selected range.

11. A method of converting an input digital video signal into an output video signal as set forth in claim 9, wherein the third color component depends upon the first and second color difference luminance components of the digital input video signal and wherein the first and second color lookup tables include, respectively, contributions of the first and second color difference signals to the third color component.

12. A method of converting an input digital video signal into an output video signal as set forth in claim 8, and further comprising:

aligning the first, second and third color components into a sixteen bit format for the output video signal.

13. A method of converting an input digital video signal into an output video signal as set forth in claim 8, and further comprising:

aligning the first, second and third color components into a selected three color format for the output video signal.

14. A method as set forth in claim 13, and further comprising:

producing a video image from the three color component values of the output video signal.

15. Apparatus for converting an input digital video signal having a luminance component for each pixel and two color difference components for each pixel region to an output video signal having three color components, the apparatus comprising:

a data storage device;

a first lookup table stored in the data storage device having a plurality of entries, each entry including a first color subcomponent value for a color of the output video signal;

a second lookup table stored in the data storage device having a plurality of entries, each entry a second color subcomponent value for the color;

means for generating an address into the first color lookup table from a luminance component for a pixel and a first color difference component for a pixel region;

means for generating an address into the second color lookup table from a luminance component for the pixel and a second color difference component for the pixel region;

means using the addresses for retrieving the color subcomponent values from the from the first and second lookup tables, respectively; and means for combining the first and second color subcomponent values to generate the color component for the video output signal.

* * * * *